(12) United States Patent
Kohnen

(10) Patent No.: US 9,373,947 B2
(45) Date of Patent: Jun. 21, 2016

(54) GROUNDING SYSTEM

(71) Applicant: Jason Kohnen, Frisco, TX (US)

(72) Inventor: Jason Kohnen, Frisco, TX (US)

(*) Notice: Subject to any disclaimer, the term of this patent is extended or adjusted under 35 U.S.C. 154(b) by 0 days.

(21) Appl. No.: 14/317,992

(22) Filed: Jun. 27, 2014

(65) Prior Publication Data

US 2015/0279521 A1 Oct. 1, 2015

Related U.S. Application Data

(60) Provisional application No. 61/971,124, filed on Mar. 27, 2014.

(51) Int. Cl.
| | | |
|---|---|---|
| *H01B 17/18* | (2006.01) | |
| *H02G 5/02* | (2006.01) | |
| *H01C 7/12* | (2006.01) | |
| *H01R 4/64* | (2006.01) | |
| *H01R 25/16* | (2006.01) | |

(52) U.S. Cl.
CPC ............ *H02G 5/025* (2013.01); *H01C 7/12* (2013.01); *H01R 4/643* (2013.01); *H01R 25/16* (2013.01)

(58) Field of Classification Search
CPC ............................. H01B 17/18; H02G 5/025
USPC ..................... 174/68.2, 70 B, 99 B, 88 B
See application file for complete search history.

(56) References Cited

U.S. PATENT DOCUMENTS 3,383,458 A * 5/1968 Raskhodoff et al. ........ 174/72 B

* cited by examiner

*Primary Examiner* — Dhirubhai R Patel
(74) *Attorney, Agent, or Firm* — Brett D. Papendick; Shuttleworth & Ingersoll, PLC

(57) ABSTRACT

A grounding system in which can be adapted for both horizontal or vertical configurations. The system can directly attach to a structure or can create an alternative grounding path depending on the components chosen. Additionally, various mounting clamps can be utilized depending on the structure.

7 Claims, 4 Drawing Sheets

US 9,373,947 B2

GROUNDING SYSTEM

CROSS-REFERENCE TO RELATED APPLICATIONS

The present application claims priority to provisional patent application 61/971,124 which was filed on Mar. 27, 2014, and is hereby expressly incorporated by reference in its entirety.

BACKGROUND

The need to protect highly sensitive electronic components, such as radios, on elevated structures, requires a comprehensive grounding system. A grounding system protects the components from surge events including voltage surges, lightning strikes, and transient voltages. In the evolving telecommunications area, certain standards are required by the industry regarding the components of the grounding system and the components attached to towers.

Grounding systems can be attached directly to a structure or can include an isolator which then directs the surge through an alternative path. Depending on the setup of the structure, components of the grounding system may need to be adapted to either horizontal or vertical configurations. Additionally, the materials used in the components may be critical to the efficiency of the system, and also play a role in the costs associated with the components and the overall grounding system.

It is an object of the invention to provide a grounding system which can be utilized on a variety of tower configurations and to prevent rotation of the grounding system.

It is a further object of the invention to provide a grounding system which can prevent rotation from the torque of multiple conductors.

SUMMARY OF THE INVENTION

A variety of base components can be selected to form a grounding system which does not rotate when attached to a structure such as a cell tower. There are two basic grounding systems, one without an isolator that can be attached directly to a structure or one which can include an isolator which then directs the surge through an alternative path. The aspects of the invention allow vertical and horizontal applications to be achieved in a relative confined space.

A bus bar having a plurality of openings, namely a series of four openings spaced ninety degrees apart from one another allow the bus bar to be connected to a grounding system and prevent rotational movement while also allowing vertical or horizontal placement of the bus bar.

An isolating member or block has a pair of openings on at least two faces of the block such that they can be connected to the bus bar and/or an adapter as part of the system.

A grounding clamp has several embodiments, however, the pattern of openings of the clamps is similar to the bus bar pattern and allows the grounding clamp to be connected to the bus bar. The grounding clamp is then connected to a structure such as a cell tower.

DETAILED DESCRIPTION

Figure 1:
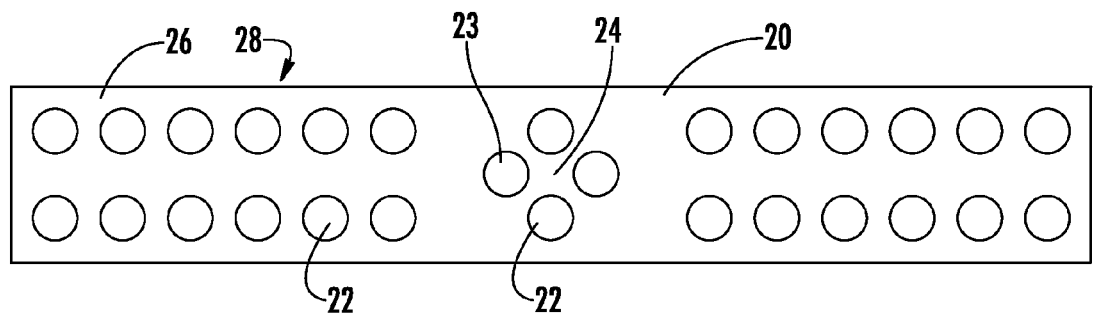
FIG. 1 is a side view of a bus bar.

Now referring to the drawings, FIG. 1 shows a bus bar 20 with a plurality of openings 22. in particular, a pair of openings 23 near or at a center 24 of the bus bar 20 are positioned such that they are equal distant from the center 24. The openings 22 are round and lead from a first side 26 of the bus bar 20 to a second side 28 of the bus bar 20. The pair of openings 23 form a pattern of four openings in which a center of each opening 23 are equal distant from the center 24 of the bus bar 20. Seeing the pair of openings 23 as a circle, each of the four openings is ninety degrees from the adjacent opening 23. This configuration or pattern allows the bus bar 20 to be utilized in vertical and horizontal applications and to prevent rotational movement of the bus bar when utilized in a grounding system.

Figure 2:
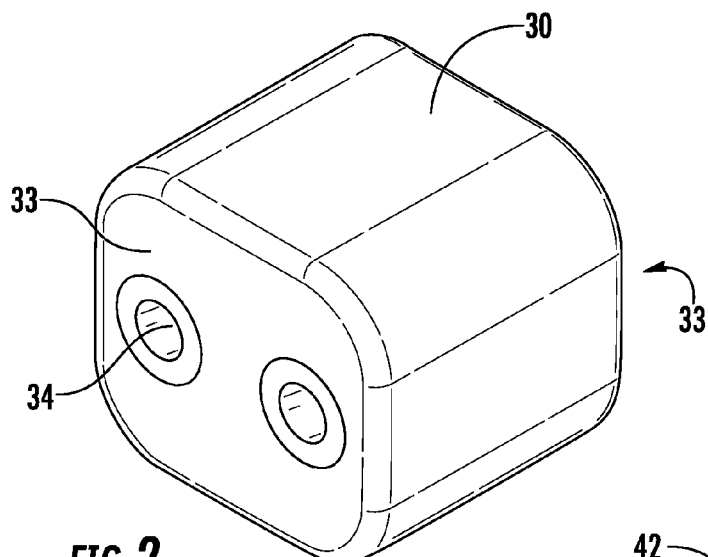
FIG. 2 is a perspective view of an isolating member.

FIG. 2 shows an isolating member 30 which is preferably in the shape of a block and is made of a non-conductive material such as fiberglass. At least two of the sides 33 have openings 34. The sides 33 are also referred to as a first side and a second side, each side with openings 34. The openings 34 are sized and figured such that they can align with the pair of openings 23 of the bus bar 20.

Figure 3:
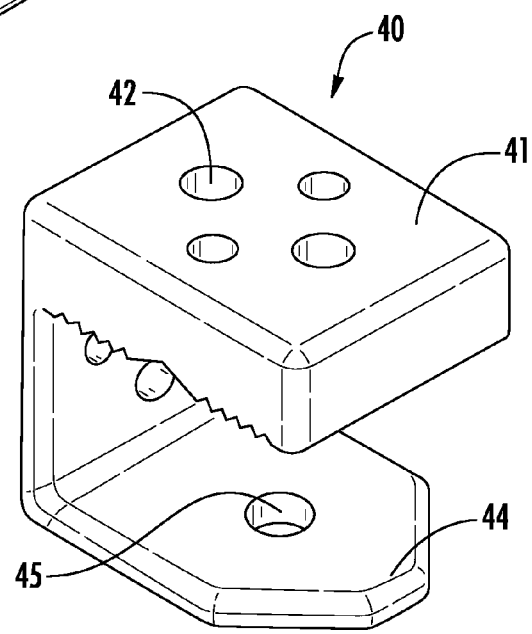
FIG. 3 is a perspective view of a grounding clamp.

FIG. 3 shows a grounding clamp 40 which can be a variety of shapes depending on the structure it Will be attached. In the embodiment shown in FIG. 3, the grounding clamp 40 is C-shaped with a first side 41 having a pair of openings 42. In FIG. 3, two pairs of openings 42 are shown for a total of four openings on the first side 41. The openings 42 are in the same pattern as those of the bus bar 20 openings 23 to accommodate vertical and horizontal applications and allow easy connection to a bus bar. A second side 44 has an opening 45 which is used in connection with a fastening device to anchor the grounding clamp 40 to a structure such as cell tower.

Figure 4:
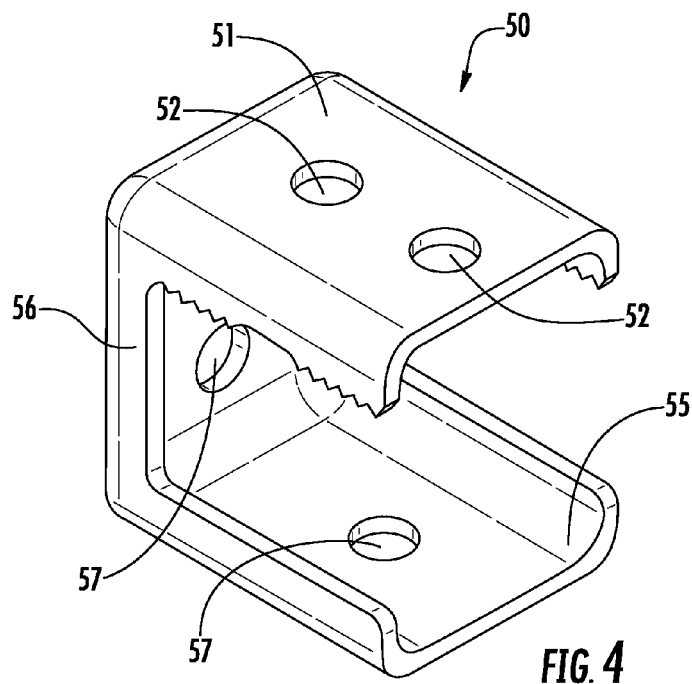
FIG. 4 is a perspective view of an adapter.

FIG. 4 shows an angle adapter 50 which can be a variety of shapes depending on the structure it will be attached. In the embodiment shown in FIG. 4, the adapter 50 is C-shaped with a first side 51 having a pair of openings 52. The openings 52 allow the adapter 50 to be secured to other parts of a grounding system. The other sides 55, 56 are also referred to as a second side and can also have openings 57 which are used in connection with a fastening device to anchor the adapter 50 to a structure such as a cell tower.

Figure 5:
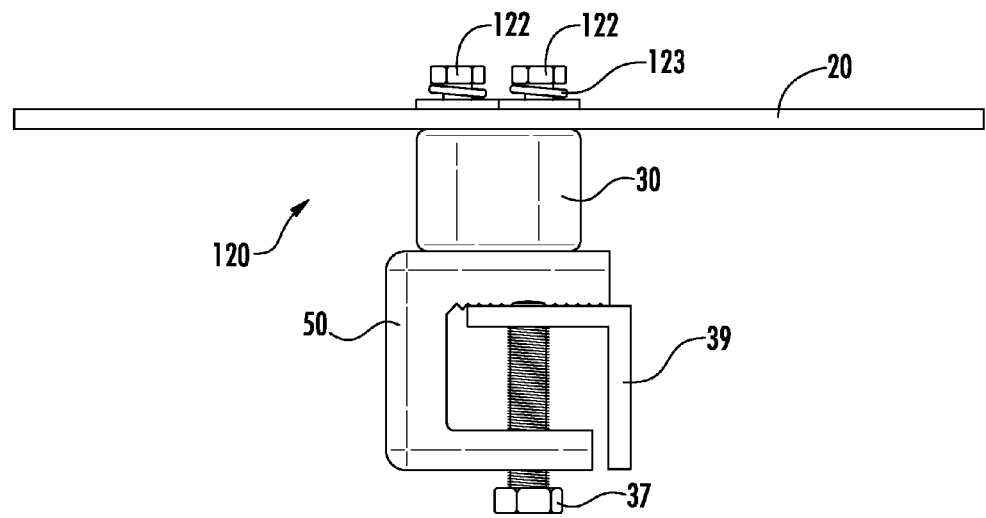
FIG. 5 is a top view of a grounding system with an isolating member.

FIG. 5 shows a first embodiment of a grounding system 120 which includes an isolating member 30, bus bar 20, and an angle adapter 50. Although a variety of fasteners could be used in the grounding system 120, bolts 122 along with washers 123 are driven into a pair of the bus bar openings 23, through the bus bar 20 and into the isolating member 30 via openings 34. The pair of bolts 122 through the openings 23 and 34 prevent rotational movement of the grounding system 120.

A second pair of bolts (not shown) attach the adapter 50 to the isolating member 30 by way of the openings 34 on a second side of the isolating member 30 and the openings 52 of the adapter 50. Finally, a fastening mechanism, another bolt 37, goes through an opening 57 in adapter 50 and then makes contact with the structure the system 120 will be attached to, which can be a metal structure such as a cell tower. The structure is shown in FIG. 5 as number 39.

Figure 6:
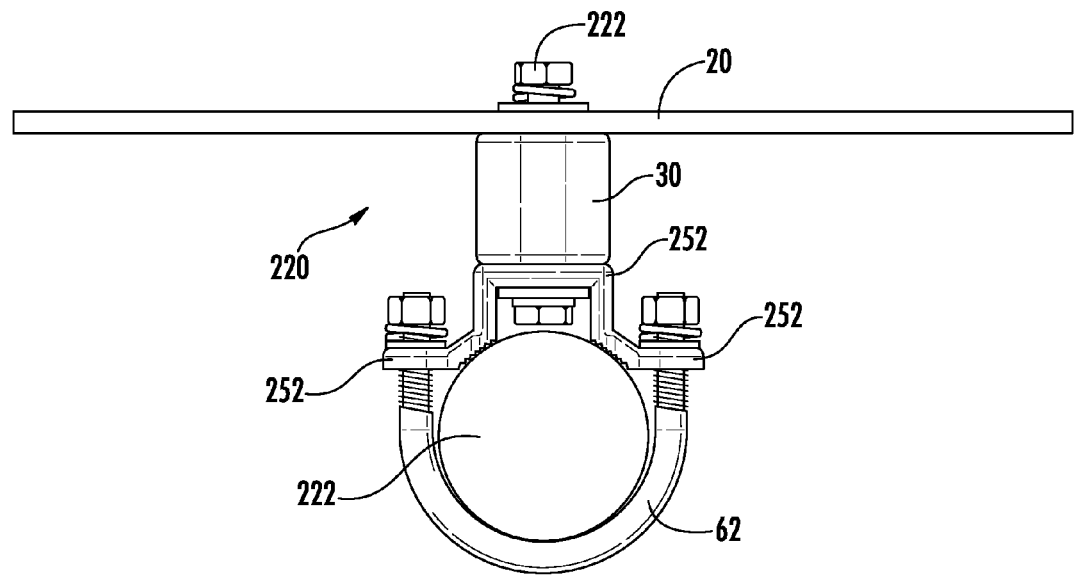
FIG. 6 is top view of a second embodiment of grounding system with an isolating member.

FIG. 6 shows a second embodiment of a grounding system 220 with an isolating member 30. The system 220 also includes a grounding damp 40 and a fastening device, a u-bolt 62. The system 220 has a grounding, damp 40 which is shaped to accommodate a cylindrical structure 222 such as a component of a cell tower. The grounding damp 40 has a plurality of flat surfaces 252. Each surface has a pair of openings which allow the damp 40 to be attached to the isolating member 30 or the u-bolt 62. The bus bar 20 is attached to the system in the same way as in FIG. 5. A pair of bolts 222 are used to attach the bus bar 20 to the isolating member 30, although the view of FIG. 6 only has one bolt due to the limitation of the top view perspective.

Figure 7:
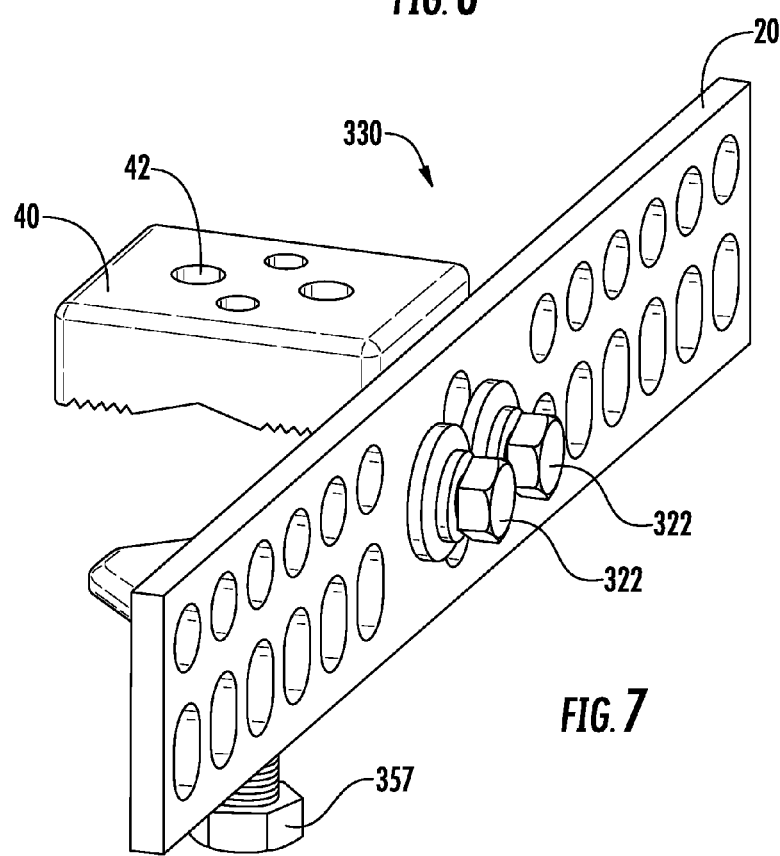
FIG. 7 is a perspective view of a grounding system without an isolating member.

FIG. 7 shows a first embodiment of a grounding system 330 which does not contain an isolating member 30. Instead the bus bar 20 is connected directly to the grounding damp 40. A fastening device Of mechanism, here bolts 322, serve to connect the bus bar 20 and clamp 40. Again, the bolts 322 enter openings of the bus bar 20 and grounding clamp 40. The particular openings chosen depend on the application, however, the use of two bolts prevents rotational movement of the components of the system 330. Similar to other embodiments, a fastening mechanism 357 is used to attach the system 330 to a structure such as a cell tower.

Figure 8:
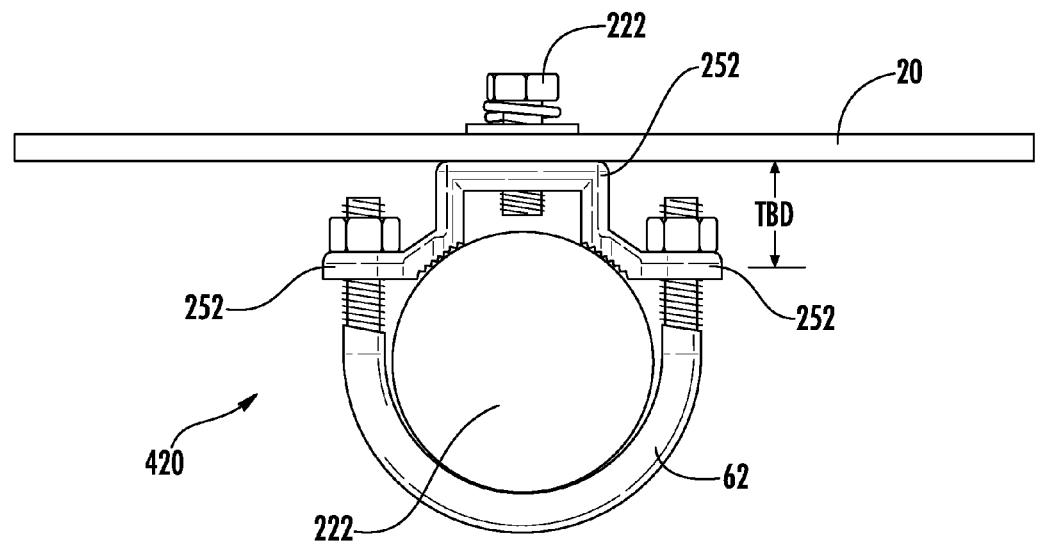
FIG. 8 is a top view of a second embodiment of a grounding system without an isolating member.

FIG. 8 shows a second embodiment of a grounding system 420 which does not have an isolating member 30. Instead, this system 420 is attached in the same way, sans the isolating member 30, as the embodiment of FIG. 6. As to the embodiments of FIGS. 6 and 8, changing the shape of the grounding clamp 40 or the bolt 62 can accommodate structures with different shapes. For instance, a rectangular shaped bolt could be used to accommodate a rectangular structure.

Figure 9:
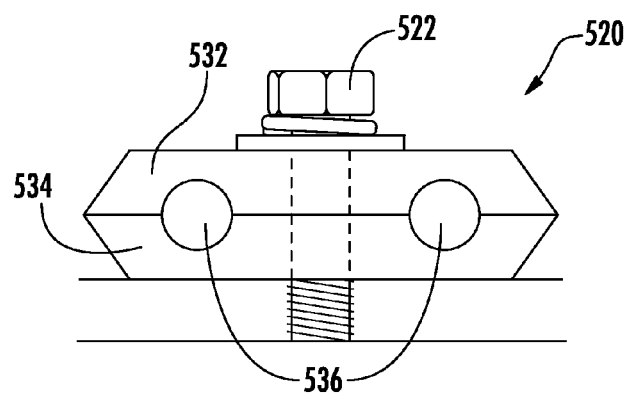
FIG. 9 is a top view of a grounding system that allows wires to be clamped.

FIG. 9 shows a grounding system 520 which has a pair of clamping members 532 and 534. The clamping members 532 and 534 have openings (not shown) which are similar to the openings in the other embodiments and accommodate bolts 522. A set of openings 536 is formed when the clamping members are connected via bolts 522 and can accommodate a wire. The size of the openings 536 can be varied by the shape and size of the clamping members 532 and 534. Again, rotational movement is prohibited by using a pair of bolts through the openings of the components.

It is an aspect of the invention that the systems can be used in tight spaces, therefore, the distance between openings on the components 20, 30, 40 and 50 are one inch when measured from the center of one opening to the center of a second opening.

Additionally, the components 30, 40 and 50 are preferably made of bronze which is less expensive than stainless steel.

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A grounding system, comprising:
an isolating member;
the isolating member having a first side and a second side;
the first side having at least two openings;
the second side having at least two openings;
a bus bar;
the bus bar having a plurality of openings;
the plurality of openings forming a pattern;
the pattern corresponding to the openings on the first side of the isolating member;
wherein the pattern allows the bus bar to be connected to the isolating member in a vertical or horizontal application;
an angle adapter;
the angle adapter having a first side with openings;
the angle adapter having a second side with an opening;
wherein the angle adapter can be mounted to a structure by use of the opening on the second side of the angle adapter;
wherein the grounding system prevents rotational movement of the bus bar whether the bus bar is in the vertical or horizontal application.

2. The system of claim 1, wherein:
the isolating member is made of a non-conductive material.

3. A grounding system, comprising:
an isolating member;
the isolating member having a first side;
the isolating member having a second side;
the first side has two openings;
the second side has two openings;
a bus bar having a set of four openings;
the set of four openings of the bus bar forming a pattern;
the bus bar four openings equal distant from a point on the bus bar;
each opening of the bus bar having a center;
at least two openings of the bus bar align with the two openings of the first side of the isolating member;
an angle adapter;
the angle adapter having a first side with openings;
the angle adapter having a second side with an opening;
wherein the angle adapter can be mounted to a structure by use of the opening on the second side of the angle adapter;
wherein the grounding system prevents rotational movement of the bus bar whether the bus bar is in the vertical or horizontal application.

4. The system of claim 3, wherein:
the isolating member is made of a non-conductive material.

5. The system of claim 4, wherein:
the bus bar is made of bronze.

6. The system of claim 5, further comprising:
the isolating member is cubical.

7. The system of claim 6, wherein:
the angle adapter has a cavity; wherein a secondary structure can be attached to the angle adapter within the cavity.

* * * * *